Figure 8:

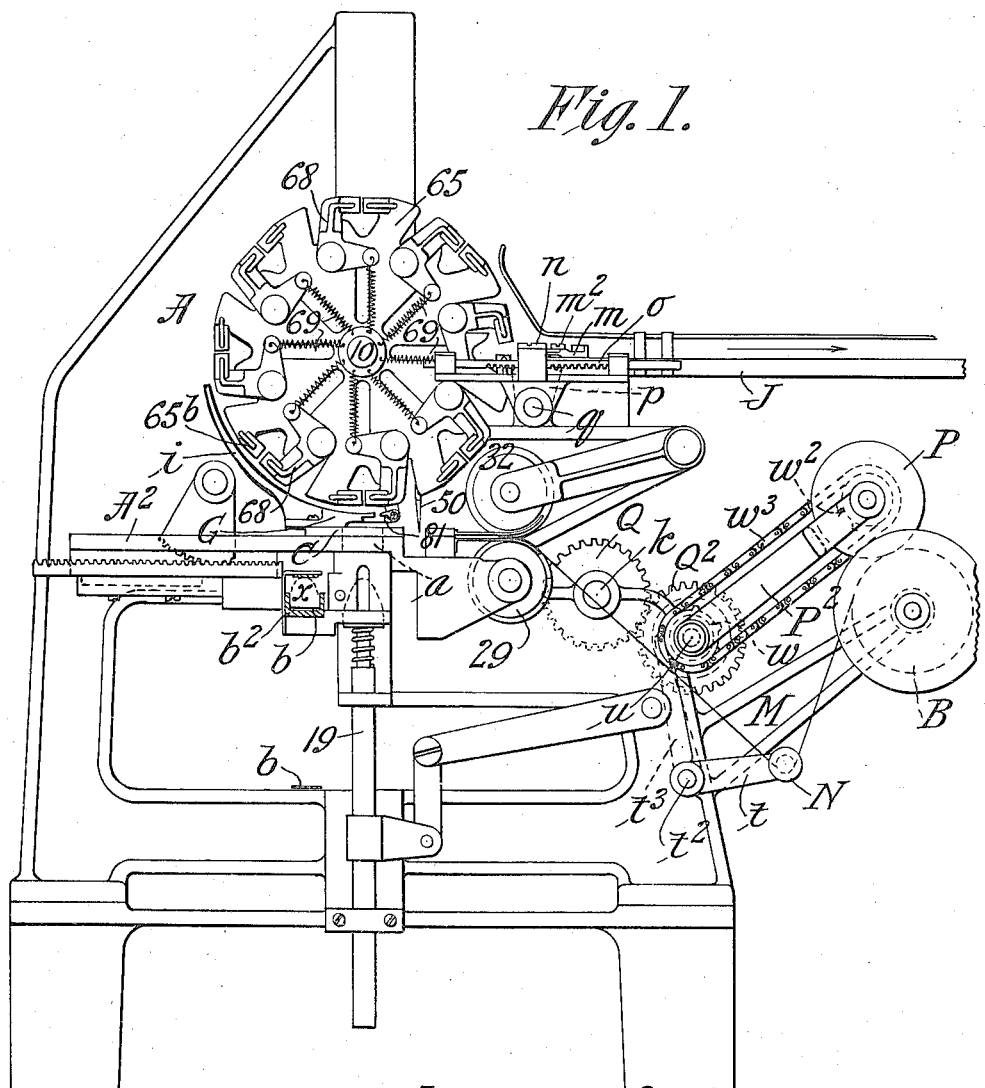

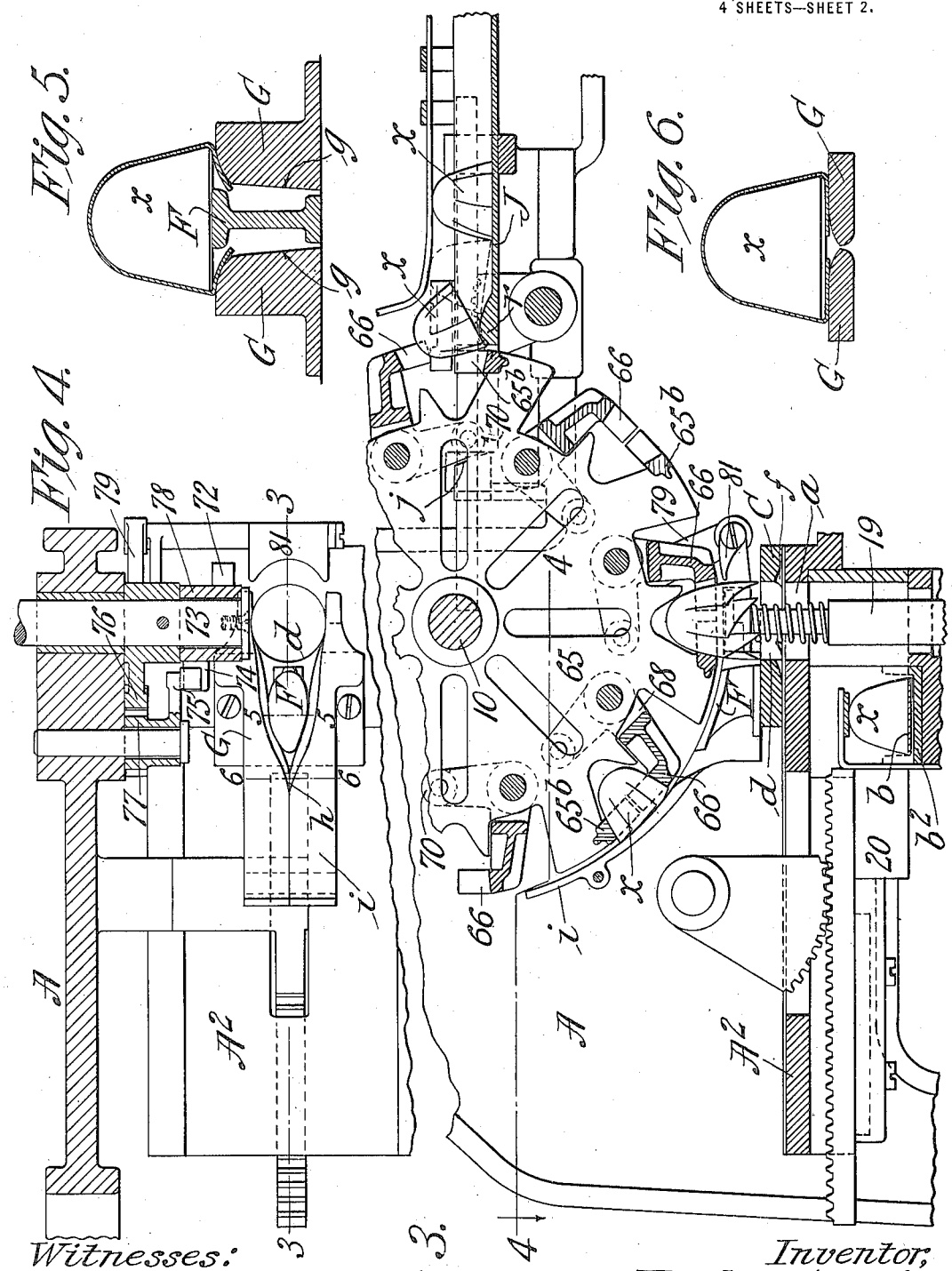

T. G. McGIRR.
WRAPPING MACHINE.
APPLICATION FILED OCT. 1, 1913.

1,158,522.

Patented Nov. 2, 1915.
4 SHEETS—SHEET 3.

Witnesses:
R. M. Mowry
W. P. Noble

Inventor,
Theodore G. McGirr,
by
Attorney.

T. G. McGIRR.
WRAPPING MACHINE.
APPLICATION FILED OCT. 1, 1913.
1,158,522.
Patented Nov. 2, 1915.
4 SHEETS—SHEET 4.
Fig. 12.
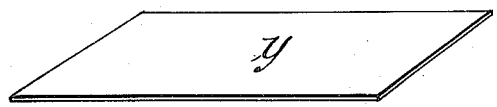
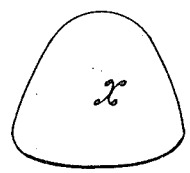
Fig. 13.
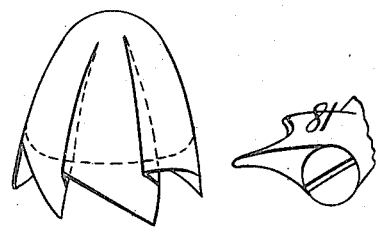
Fig. 14.
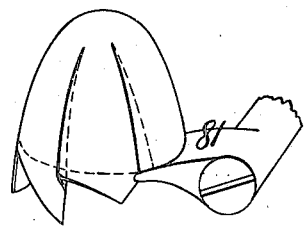
Fig. 15.
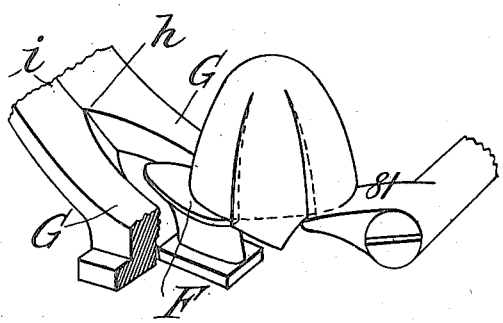
Fig. 16.
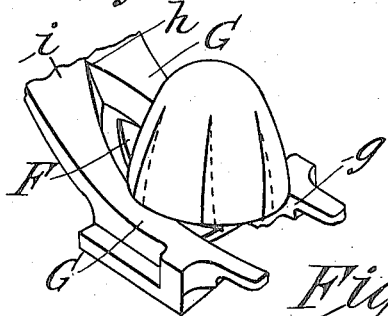
Fig. 17.
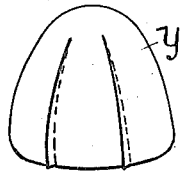
Fig. 18.
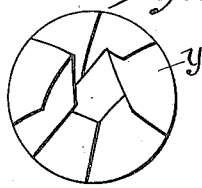
Witnesses:
R. M. Mowry
W. P. Noble.
Inventor,
Theodore G. McGirr,
by
Attorney.

UNITED STATES PATENT OFFICE.

THEODORE G. McGIRR, OF SPRINGFIELD, MASSACHUSETTS, ASSIGNOR TO USONA MACHINE COMPANY, OF SPRINGFIELD, MASSACHUSETTS, A CORPORATION OF NEW YORK.

WRAPPING-MACHINE.

1,158,522.      Specification of Letters Patent.      Patented Nov. 2, 1915.

Application filed October 1, 1913. Serial No. 792,800.

*To all whom it may concern:*

Be it known that I, THEODORE G. McGIRR, a citizen of the United States of America, and resident of Springfield, in the county of Hampden and State of Massachusetts, have invented certain new and useful Improvements in Wrapping-Machines, of which the following is a full, clear, and exact description.

This invention relates to wrapping machines and more especially to a machine for the wrapping of chocolate drops or pieces of confectionery which are of a general dome shape, that is of conoidal or hemispherical form.

The machine is one in which wrapper sheets or sections of tin-foil are successively fed in juxtaposition to means which also bring the pieces, one at a time, to a location adjacent the receiving jaws of a carrier and into which each piece, partially wrapped by the sheet, is forced past or through an appliance which causes the marginal portions of the sheet to assume a circular or sheath-like disposition, and to receive a plurality of crimpings on lines defining and facilitating the subsequent infolding, and in which the rotatable carrier conveys the piece, with the wrapper in an inclosing relation about the top and circumferential sides of the piece and with its extension portions extending beyond the exposed face of the piece, past and to the action of appliances which fold or tuck, against the base of the article to be wrapped, the forward and side marginal portions of the wrapper,—the rear marginal portion of the wrapper having been inturned against the base of the piece next previous to the forward progressive movement of the carrier.

The machine furthermore comprises means whereby the wrapped chocolate drops are withdrawn from the carrier at a point remote from that in which it was received in a direction radial of the carrier and in a manner so that they will be delivered axially vertical and with their bases lowermost, onto a receiving board or trough therefor.

The present machine, furthermore, embodies improved means for the forward feeding or supplying of the wrapper material (tinfoil) which is in the form of a very thin and delicate ribbon and with especial regard for the positive forward delivery in successive step-like movements and in the exact amount required with an absolute avoidance of stretching, straining or distortion of such wrapping material.

The machine in its general organization is one like that described and claimed in an application for patent filed by me August 16, 1912, Serial No. 715,385, and which machine was especially designed for the wrapping of small rectangular objects such as yeast cakes; and while the subject matter of the present machine is in many respects the same as that shown and described in my aforementioned application, there are, nevertheless, radically different and important devices and appliances from some of those in my earlier machine both in respect of the nature of the work to be accomplished and in the manner of the accomplishment thereof.

The invention as comprised in a machine for the wrapping of pieces substantially of the form described, is sufficiently shown in the accompanying drawings, described in conjunction therewith, and defined in the claims.

Figure 7:
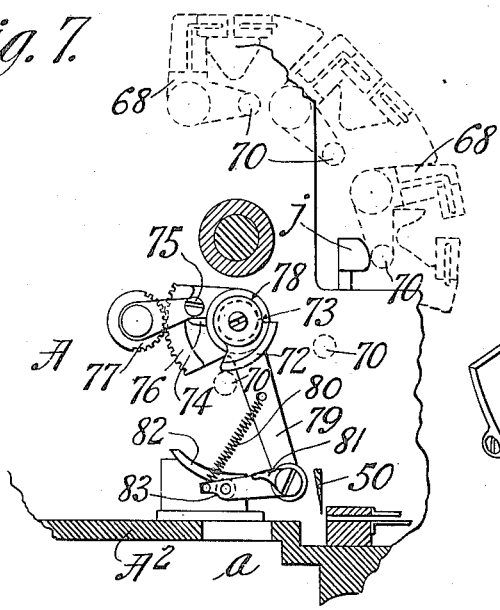
Figure 9:
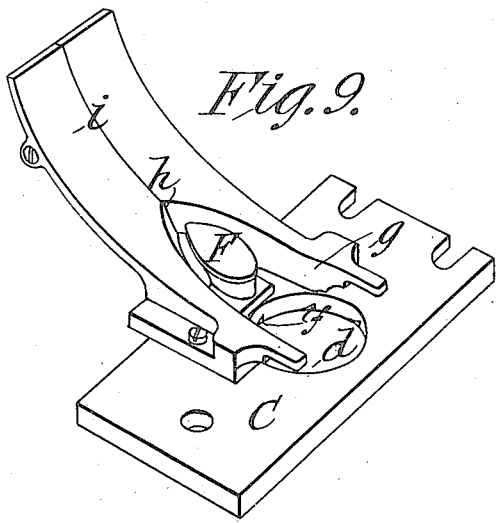
Figure 11:
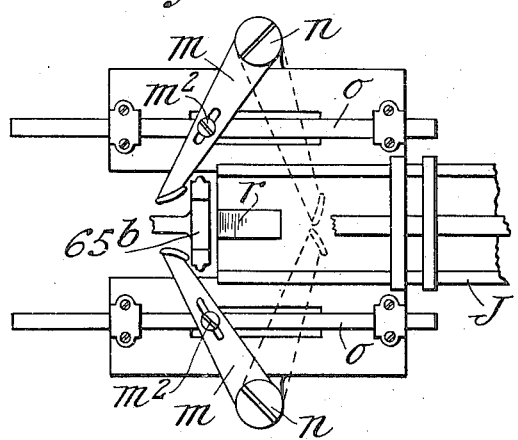
Figure 10:
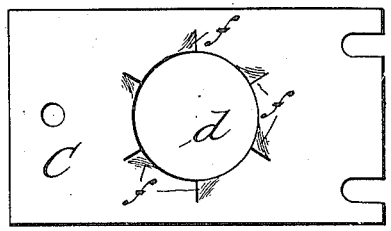

In the drawings:—Figure 1 is an elevation of the front side of the improved machine. Fig. 2 is a partial plan view with parts in section, for illustration of the wrapper feeding devices. Fig. 3 is a sectional elevation of a portion of the rotatable carrier wheel and important novel devices coacting therewith. Fig. 4 is a partial horizontal section as taken on line 4—4, Fig. 3,—the section line 3—3 on Fig. 4 indicates in a general way the plane on which the parts shown in section Fig. 3 are taken. Figs. 5 and 6 are cross sectional views, on a larger scale, for illustration of portions of the folding actions, the parts of the machine here appearing in section being taken about on the lines 5—5 and 6—6, Fig. 4. Fig. 7 is a sectional elevation of parts understood as behind the rotatable carrier wheel and for especially indicating the means by which the movable jaw of each receiver is opened in its proper time, to permit the withdrawal of the wrapped piece. Fig. 8 is a perspective view of the rear folder. Fig. 9 is a perspective view showing the appliances which effect the initial partial wrapping of the sheet about the piece, the crimping of the marginal portions of the sheet and the folding of the forward and opposite side portions of the sheet which are extended beyond the exposed side of the piece. Fig. 10 is an inverted plan view of the circularly apertured plate which forms part of the subject matter shown in Fig. 9. Fig. 11 is a plan view in illustration of the mechanism for the withdrawal of the wrapped pieces from the rotatable carrier wheel. Figs. 12, 13, 14, 15 and 16 are perspective views showing different relations of the parts and stages in the wrapping operations,—Fig. 17 representing the wrapped piece in side view or perspective, and Fig. 18 showing it in bottom plan view.

In the drawings, A represents the frame of the machine having at the front side of the upright a shelf or table-like portion $A^2$ above which is located the rotatable carrier wheel which is equipped with a circularly arranged series of pairs of receiving jaws for the chocolate drops,—one jaw $65^b$ of each pair being formed as an integral part of the body of the wheel while the movable jaws 66 are constituted by the suitably formed extremities of the angle levers 68 which are pivotally mounted on the disk-like body of the wheel and are normally held in their closed positions by the springs 69.

The carrier wheel 65 is mounted on the horizontal shaft 10 which has an intermittent rotative motion imparted thereto in the manner described in the aforementioned application. In the horizontal frame portion $A^2$ under the center of the carrier wheel is an aperture $a$ up through which the chocolate drops with a wrapper sheet thereover are forced by the vertical reciprocatory plunger 19 into the then opened jaws of the carrier in position therefor. The wrapper sheet is furnished from a supply roll B and fed horizontally over the aperture of the horizontal portion $A^2$ of the frame,—a forward portion of the supply strip sufficient to make a wrapper being cut off by the knife or shear 50.

The chocolate drops, or other pieces, represented by $x$, are carried on a feed belt $b$, the upper course of which is just below the horizontal portion $A^2$ of the frame, through a horizontal guide trough $b^2$ and when opposite the aforementioned aperture $a$ are by the pusher 20, operated by rack and oscillatory segment, pushed to a position over the head of the vertically reciprocating plunger 19 to be forced by the latter upwardly through the hole $a$ into the carrier jaws.

The actions thus far referred to are substantially the same as carried out in the machine forming the subject matter of the aforementioned application.

On the frame portion $A^2$ is a plate C having a circular hole $d$ therethrough registering with the aforementioned aperture $a$, and which hole is of a diameter slightly larger than that of the piece of confectionery which is next under the wrapper sheet forced upwardly therethrough. In the under side of the plate C are spaced notches $f f$ marginally of the hole $d$ which notches are made with their walls or boundaries outwardly convergent and preferably of ratchet shape.

As the wrapper sheet $y$ over the chocolate drop is forced up through the hole $d$, it has its portions extending from more or less near its middle to its margin crimped, somewhat as represented in Fig. 13 of the drawing, and also shown in readiness to be grasped by the lowermost pair of jaws of the rotatable carrier wheel in Fig. 3. This crimping effect is produced by the notched formation of the plate C marginally of the hole $d$ shown and above referred to. Directly the movable jaw 66 closes to its sufficient, though comparatively slight, gripping action on the piece with the wrapper entirely around it, excepting at its base, below which the crimped wrapper extends, substantially as shown, the rear folder 81 moves forwardly a comparatively short, though sufficient distance, that is to the leftward, as the parts are seen in the drawing, to fold the rear depending portion of the wrapper inwardly onto the bottom of the candy drop while the latter is still held stationary by the temporary immovable carrier wheel.

The rear folder is pivotally carried at the lower extremity of an arm 79 which is formed as a part of a sector gear 76 and to which rocking reciprocatory movement is imparted by reason of its being affixed on the oscillatory shaft 73. The rear folder 81 has as an adjunct thereof a member 83 coacting with a cam 82 against which it is held by the spring 80, so that the movement of the rear folder will be substantially parallel with and adjacent the plane of the bottom of the candy drop. The oscillatory shaft 73 has loosely or pivotally mounted thereon an annular member 78 provided with an eccentric or cam portion 72 and an abutment 74. The sector 76 meshes with a sector 77 on a stud shaft and which has a roller provided arm 75 coacting with the abutment whereby the cam is positioned as required for alternately opening and closing each movable jaw of the carrier wheel while each jaw is at its lowermost position, it being understood that on one arm of each jaw is a roll or stud 70 with which the cam 72, under its oscillation engages and disengages for the opening of the jaw and for permitting it to close.

The means above referred to for actuating the rear folder, and the movable jaws of the carrier wheel as they are successively brought to the piece receiving position are substantially the same as described, and shown, particularly in Fig. 18 in my aforementioned application. The rear folder in the present instance is, however, made with its forward edge convex for the best folding action at the rear of the piece which is of the shape here designated.

Just forward of the hole $d$ in the plate C and the position of the lowermost pair of jaws of the carrier wheel is a stationary member F which is of less width than that of the candy piece and the upper face of which is at an upper and forward inclination adjacent the circumference of the carrier wheel.

After the rear part of the wrapper has been folded inwardly under the piece, as represented in Fig. 14, by the rear folder 81, the next action under the forwardly progressive movement, revolubly of the piece, in relation to the member F, is to secure the inwardly folding in a relatively rearward direction of the forward depending portions of the wrapper onto the bottom of the piece, as seen in Fig. 15,—the opposite side depending portions of the wrapper which in transit escape the comparatively narrow member F, being left in their depending position.

G G represent members having locations adjacent the path of movement of the revoluble jaws in opposed relation, having their rear portions separated by a space slightly greater than the diameter of the piece to be wrapped. These members have their inner faces forwardly convergent, the same being approximately helicoidal surfaces, merging from surface portions $g\ g$ at the rear which are more or less nearly vertical into a surface at the point $h$ of convergence which on a line transversely thereof is horizontal, the cross sectionally horizontal portions of the converged members being continued in an arc shaped extension $i$, the upper surface of which for a considerable distance is in proximity to the periphery of the carrier wheel.

The opposite side portions of the wrapper depending below the base of the piece in the jaws of the carrier, as indicated in Fig. 15, after the rear and front portions have been inturned, are under the revolubly progressive movement imparted by the carrier wheel to the piece and its wrapper brought to impingement with and to be inwardly crowded by the helicoidal or scroll-like surfaces until coming to and passing beyond the point of convergence, at $h$, of such surfaces all of the portions of the wrapper in turn onto the base of the piece are subjected to a rubbing action in relation to the curved extension $i$ whereby to be, as it were, "ironed" and "set" in inwardly closing condition at the bottom of the piece.

The carrier wheel being moved step by step, each pair of its jaws containing a wrapped piece is brought opposite a horizontal receiving or delivery board J at which place the movable jaw of each pair of jaws is forced and momentarily held in open position as represented in Figs. 1, 3 and 7, while an ejector for the wrapped piece operates to remove the piece from the jaws and carries it horizontally clear from the latter onto the delivery board.

Each movable jaw is opened, as above stated, by the impingement of the stud or roller 70 against the inclined or cam face of a lug $j$ or part fixed in suitable position on a supporting part of the frame.

The ejector is shown in side and sectional elevations and in plan respectively in Figs. 1, 3 and 11 and is located in proximity to the delivery board or trough J. This, as shown, consists in a pair of opposite horizontal flat lever arms $m\ m$ pivotally mounted at $n\ n$ on suitable bracket supports therefor, and extending in approached relations one to another. Closely beneath these lever arms $m\ m$, are a pair of horizontal rack bars $o\ o$ with the teeth of which at their under side duplicated sector gears $p$ mesh, said sector gears being both mounted on a short transverse rock shaft $q$ to which a quick oscillatory movement is imparted in any appropriate manner, as, for instance, through means of a cam lever operated from any suitably driven shaft in the machine. The rack bars and arms $m$ have stud and slot engagements shown at $m^2$.

The range of movement of the pair of ejector arms $m\ m$ is indicated in Fig. 11, the full lines showing them as behind the jaws, while the dotted lines show their outward positions and indicating the extent to which the wrapped piece is positively outwardly moved onto the delivery board.

Inasmuch as the wrapped pieces are presented successively at a location adjacent the inner end of the delivery board with the greater portion of the bulk of the pieces above the level of such board and with the pieces axially horizontal, radially of the carrier wheel, their bases, of course, being vertical, I provide a shoulder or abutment $r$, Figs. 3 and 11, at the inner end of the delivery board against which the lower corner of the wrapped piece in being withdrawn by the ejector arms $m$ engages whereby it is partially overturned in a manner represented by the full and dotted lines in Fig. 3, so as to have its bottom rest upon the delivery board or trough, conducing to unformity of positioning of the pieces in their discharge and the avoidance of their becoming ruptured, distorted or in any way injured.

The strip of foil passes from the supply roll B which is loosely mounted for rotation in the bracket M downwardly around and then upwardly from the roller N carried on an approximately horizontal arm $t$ of an elbow lever which is pivoted at $t^2$ on the side of the frame. Bearing on the top of the supply roll B is a narrow roller P which is carried in a forked yoke P² which is loosely pivotally mounted on a horizontal shaft $u$. On the said shaft and on the arbor of the roller P which is carried in the yoke are sprocket wheels $w$ and $w^2$ around which runs a sprocket chain $w^3$. Said shaft $u$ is driven from the suitably driven shaft $k$ by the gear wheels Q and Q² through a friction clutch Q³. The gear wheel Q² is pinned, keyed, or otherwise fixed to the member Q⁴ of the friction clutch which is loose on the shaft $u$, while the companion member Q⁵ has a pin and slot connection with the shaft indicated at Q⁶ whereby in effect it is slidable axially of the shaft but constrained to rotate in unison therewith; and this member Q⁵ of the friction clutch is by the spring Q⁷ pressed against the member Q⁴ with sufficient firmness to cause, ordinarily, the rotation of the shaft $u$ because of the rotation of the gear wheel Q² and clutch member Q⁴.

The angle lever comprises an upstanding arm $t^3$ which bears against the hub of the clutch member Q⁵ either very lightly or with a considerable pressure according to the condition of the supply strip at its bight in engagement around the roller N of the lever arm $t$.

In case the supply strip is running in just about the amount required and as taken care of by the feed rolls 29, 32 (provided in the same situation and for the same mode of action as in the machine described in my former application), the approximately horizontal arm $t$ of the bell crank lever will be held in such elevation as to relieve the pressure by the upstanding arm $t^3$ against the hub of the friction clutch member Q⁵; but in case by undue momentum or other cause the supply strip is run off from the supply roll unduly fast and so there will be a sagging or slackening at the roll N, then the bell crank lever will automatically swing so that its upstanding arm $t^3$ will act as a brake to prevent the rotation of such member and the shaft $u$ as well also as the friction roller P, thus governing or regulating the feed of the supply strip. This let off and regulating means for the supply strip is especially advantageous for use in connection with a thin, delicate material such as foil, which may be easily stretched or distorted,—the provision of the feed rolls 29 and 32 exerting a pulling action on the strip and the roller P exerting frictionally a rotation imparting action on the body of the supply roll B, preventing stretching and distortion of the wrapping material of the character described.

I claim:—

1. In a wrapping machine, in combination, a rotatable carrier having a series of circumferentially arranged and spaced, coacting pairs of fixed and movable jaws, and means for periodically opening and closing the movable jaws, a plate having a circular opening under the position of the carrier where its movable jaw is temporarily opened, means for feeding a piece, and a wrapper sheet through said opening, whereby the piece and sheet in partially wrapped relation thereto are entered, into, and to be engaged by, the jaws of the carrier, and a stationary member of less width than the piece, arranged adjacent the path of movement of said jaws forward of and having a width less than that of said circular hole and operable to fold the forward portion of the wrapper against the exposed side of the piece.

2. In a wrapping machine, in combination, a rotatable carrier having a series of circumferentially arranged and spaced, coacting fixed and movable jaws, and means for periodically opening and closing the movable jaws, a plate having a circular opening under the position of the carrier where its movable jaw is temporarily opened, means for feeding a piece and a wrapper sheet through said opening, whereby the piece and sheet in partially wrapped relation thereto are entered, into, and to be engaged by, the jaws of the carrier, means for folding the rear portion of the wrapper against the exposed side of the piece, and a stationary member of less width than the piece, arranged adjacent the path of movement of said jaws forward of, and having a width less than that of, said circular hole and operable to fold the forward portion of the wrapper against the side of the piece.

3. In a wrapping machine, in combination, a rotatable carrier having a series of circumferentially arranged and spaced, coacting fixed and movable jaws, and means for periodically opening and closing the movable jaws, a plate having a circular opening under the position of the carrier where its movable jaw is temporarily opened, means for feeding a piece and a wrapper sheet through said opening, whereby the piece and sheet in partially wrapped relation thereto are entered, into, and to be engaged by, the jaws of the carrier, a stationary member of less width than the piece, arranged adjacent the path of movement of said jaws forward of and having a width less than that of said circular hole and operable to fold the forward portion of the wrapper against the exposed side of the piece, and means for folding opposite side portions of the wrapper also against the piece.

4. In a wrapping machine, in combination, a rotatable carrier having a series of circumferentially arranged and spaced, coacting fixed and movable jaws, and means for periodically opening and closing the movable jaws, a plate having a circular opening under the position of the carrier where its movable jaw is temporarily opened, means for feeding a piece and a wrapper sheet through said opening, whereby the piece and sheet in partially wrapped relation thereto are entered, into, and to be engaged by, the jaws of the carrier, a stationary member of less width than the piece, arranged adjacent the path of movement of said jaws forward of, and having a width less than that of, said circular hole and operable to fold the forward portion of the wrapper against the exposed side of the piece, and means for folding the rear portion of the wrapper also against the side of the piece.

5. In a machine for wrapping pieces of substantially the shape described, in combination, a movable carrier having a device for receiving and holding a piece to be wrapped and a sheet in partially wrapped condition about the piece, means for forcing a piece and the sheet into the receiving device, and means for causing the sheet to assume its partially wrapped condition relatively to the piece with its marginal portions extended beyond the exposed side of the latter, means for imparting crimpings to the sheet, and means for folding the extension portions of the sheet to overlie the exposed face of the piece.

6. In a machine for wrapping pieces of substantially the shape described, in combination, a rotatable carrier wheel having a series of peripherally arranged pairs of fixed and movable jaws and means for periodically opening and closing said jaws, a plate having a circular hole therein at a position under that to which the jaws are successively brought, provided with spaced notches in its under side marginally of the hole therethrough, and means for forcing the pieces in conjunction with wrapper sheets therefor upwardly through said circular hole and into the jaws of the rotatable carrier.

7. In a machine for wrapping pieces of substantially the shape described, in combination, a movable carrier having a device for receiving and holding a piece to be wrapped and a sheet in partially wrapped condition above the piece, means for forcing a piece and the sheet into the receiving device, and means for causing the sheet to assume its partially wrapped condition relatively to the piece with its marginal portions extended beyond the exposed side of the latter, means for imparting crimpings to the sheet, and stationary members, past which the partially wrapped piece is carried, for folding the forward and lateral extension portions of the sheet to overlie the exposed face of the piece.

8. In a machine for wrapping pieces of substantially the shape described, in combination, a rotatable carrier wheel having a series of peripherally arranged pairs of fixed and movable jaws and means for periodically opening and closing said jaws, a plate having a circular hole therein at a position under where the jaws are successively brought, provided with spaced notches in its under side marginally of the hole therethrough, which notches are radially convergent, and means for forcing the pieces in conjunction with wrapper sheets therefor upwardly through said circular hole and into the jaws of the rotatable carrier.

9. In a machine for wrapping pieces of substantially the shape described, in combination, a movable carrier provided with pairs of jaws progressively movable therewith, and jaw actuating means, means for feeding pieces to be wrapped and wrapper sheets in partially wrapped relation to the pieces to positions for engagement by said jaws, and members, having locations adjacent the path of movement of the jaws, in opposed relations, having their rear portions separated by a space as great as the diameter of the piece to be wrapped, and forwardly convergent, and also forwardly merging from their rear surfaces, which are vertical to a surface which is horizontal.

10. In a machine for wrapping pieces of substantially the shape described, in combination, a movable carrier provided with pairs of jaws progressively movable therewith, and jaw actuating means, means for feeding pieces to be wrapped and wrapper sheets in partially wrapped relations to the pieces to positions for engagement by said jaws, members, having locations adjacent the path of movement of the jaws, in opposed relations, having their rear portions separated by a space as great as the diameter of the piece to be wrapped, and forwardly convergent, and also forwardly merging from their surfaces, which are vertical to a surface which is horizontal, and means for folding the rearward and forward extension portions of the wrapper against the side of the piece.

11. In a machine for wrapping pieces of substantially the shape described, in combination, a movable carrier provided with pairs of jaws progressively movable therewith, and jaw actuating means, and means for feeding pieces to be wrapped and wrapper sheets in partially wrapped relation to the pieces to positions for engagement by said jaws, members having locations adjacent the path of movement of the jaws, in opposed relations, having their rear portions separated by a space as great as the diameter of the piece to be wrapped formed with inwardly facing vertical surfaces and forwardly convergent and also forwardly merging from their rearward vertical surfaces which are vertical to a surface which is horizontal, said horizontal surface into which the separated surfaces are merged being continued forwardly beyond the point of convergence.

12. In a machine for the wrapping of pieces of substantially the form described, in combination, a rotatable carrier having a series of pairs of jaws, one of each thereof being movable for opening and closing relations to the other, and for receiving the wrapped pieces therein, of a delivery support adjacent to which pairs of jaws are successively brought, presenting the piece axially horizontal and radially of the wheel, means operative for the withdrawal of the pieces from said jaws onto the delivery support radially of the wheel, and means for causing a partial overturning of the piece coming onto the said support.

13. In a machine for the wrapping of pieces, in combination, a rotatable carrier having a series of pairs of jaws,—one of each thereof being movable for opening and closing relations to the other,—and for receiving the wrapped pieces therein, of a delivery support adjacent to which pairs of the jaws are successively brought, a pair of arms in opposed relations mounted to swing in a horizontal plane to pass within the open jaws behind the piece and in outwardly swinging to have approached relations to engage the piece, a pair of horizontally guided rack bars having stud-and-slot engagements with said arms, and a rock shaft having sector gears in mesh with said rack bars.

Signed by me at Springfield, Mass., in presence of two subscribing witnesses.

THEODORE G. McGIRR.

Witnesses:
G. R. DRISCOLL,
WM. F. BELLOWS.